Feb. 24, 1925.  
R. E. SCRIVNER  
SPRING SUSPENSION  
Filed May 1, 1923
1,527,381
2 Sheets-Sheet 1
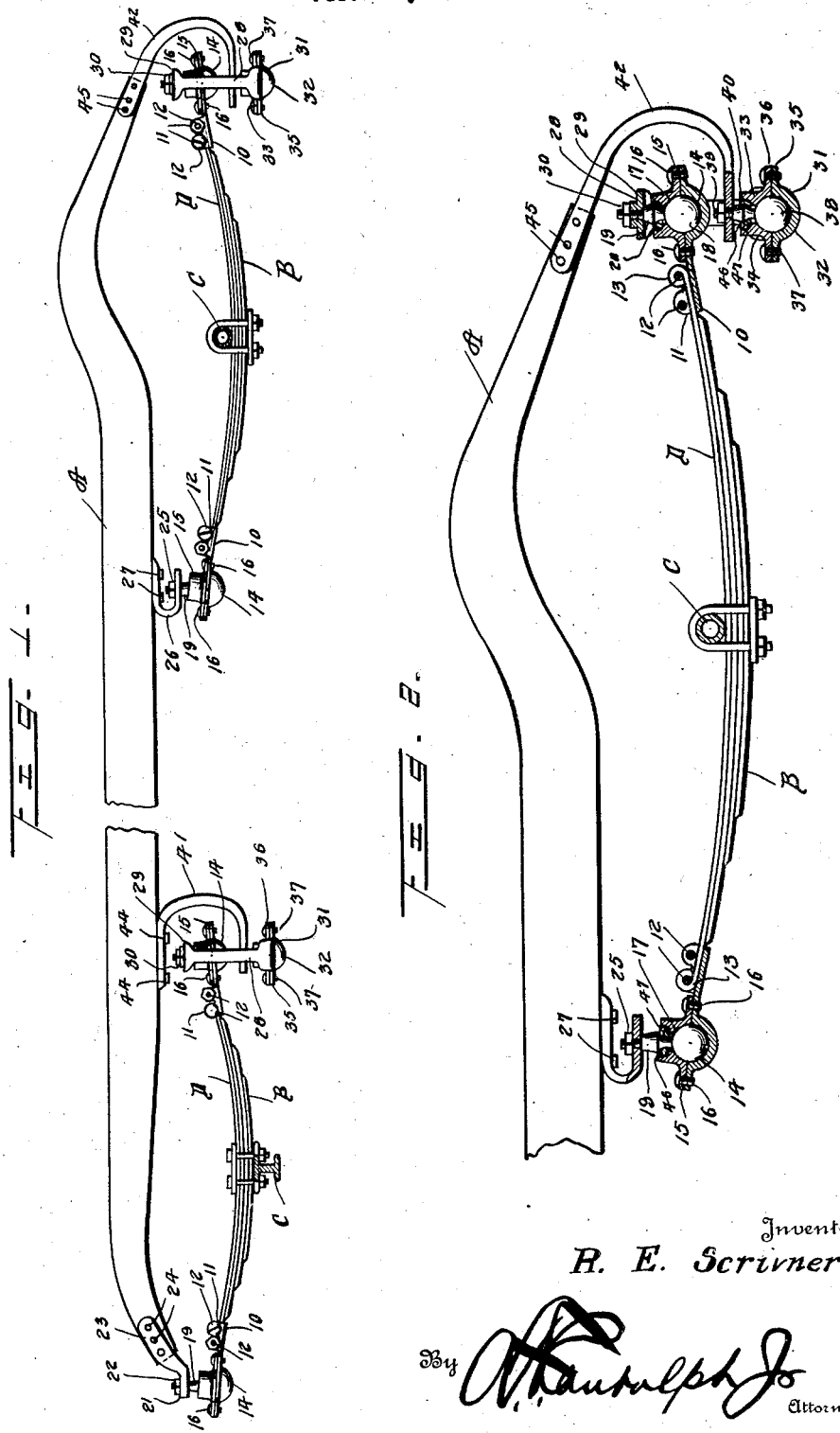
Inventor  
R. E. Scrivner.  
By  
Attorney Feb. 24, 1925.
R. E. SCRIVNER
1,527,381
SPRING SUSPENSION
Filed May 1, 1923
2 Sheets-Sheet 2
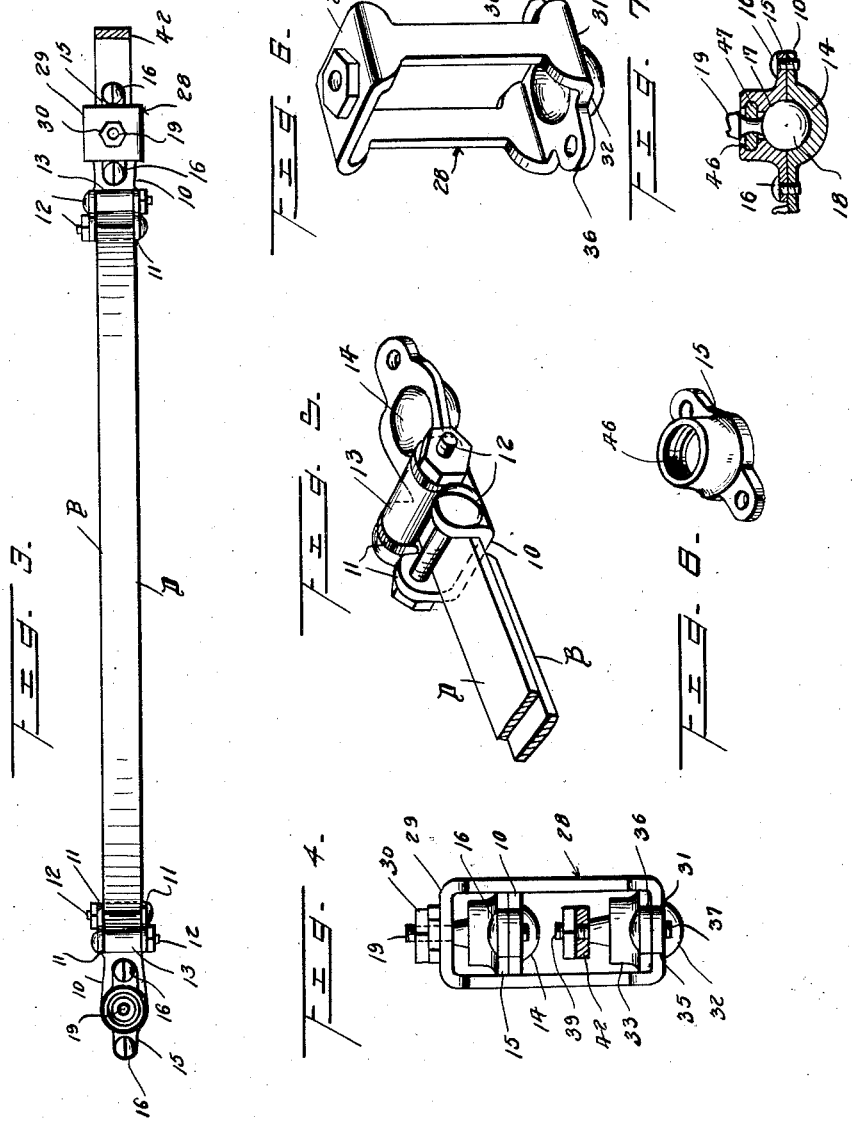
Inventor
R. E. Scrivner.
By
Attorney Patented Feb. 24, 1925.

1,527,381

UNITED STATES PATENT OFFICE.

ROBERT E. SCRIVNER, OF PENDLETON, OREGON, ASSIGNOR OF ONE-TENTH TO CLAUD E. PENLAND, ONE-TENTH TO CLARENCE H. PENLAND, AND ONE-TENTH TO WILL PENLAND, ALL OF PENDLETON, OREGON.

SPRING SUSPENSION.

Application filed May 1, 1923. Serial No. 635,992.

*To all whom it may concern:*

Be it known that I, ROBERT E. SCRIVNER, a citizen of the United States, residing at Pendleton, in the county of Umatilla and State of Oregon, have invented certain new and useful Improvements in Spring Suspension; and I do hereby declare the following to be a full, clear, and exact description of the invention, such as will enable others skilled in the art to which it appertains to make and use the same.

This invention relates to a suspension means for springs of that type used to suspend or mount the wheel axles of automobiles and the like.

It is aimed to provide a generally improved means whereby there will be less danger of breakage of the springs, in which the car or vehicle equipped therewith will have easier riding qualities, a construction which may be applied practically to all types of such springs and particularly to both those of the elliptic and cantilever types.

Another important object is to provide a novel construction which may be more efficiently lubricated and one which particularly uses an absorbent means to receive the lubricant and to diffuse it to the proper parts.

Various additional objects and advantages will become apparent from a consideration of the description following taken in connection with accompanying drawings illustrating an operative embodiment.

In said drawings:—

Figure 1 is a side elevation with the invention applied to the springs at both the front and rear of a side beam of an automobile chassis;

Figure 2 is a vertical sectional view on an enlarged scale of the parts at the front half of Figure 1;

Figure 3 is a plan view of one of such springs and my improvements, the side beam being omitted;

Figure 4 is an end elevation of the improvement attached to the spring;

Figure 5 is a detail perspective view illustrating the connection of the supporting parts to the spring;

Figure 6 is a detail perspective view of the shackle;

Figure 7 is a detail sectional view of a fragmentary portion of the attaching arm and associated parts, and Figure 8 is a detail perspective view of one of the socket members.

To facilitate an understanding of the invention, one of the longitudinal side beams of a conventional automobile or vehicle chassis is shown at A with laminated springs of elliptic or cantilever type at B and adjacent the ends thereof which resiliently carry axles C to mount the wheels of the automobile or vehicle.

In carrying out the invention, the uppermost leaf as designated D, has an attaching arm 10 fastened to each end thereof. Attaching arms 10 have upstanding ears 11 engaging opposite side edges of the springs and which receive fastening bolts 12 extending across the upper surface of such leaves D. The free end of said leaves D are preferably formed into sleeves 13 through which the adjacent bolts 12 pass.

Each arm 10 is provided with a semi-spherical depression or pocket as at 14. Plates 15 are detachably bolted or otherwise fastened as at 16 to arms 10. Each plate 15 has a substantially semi-spherical portion or recess 17 in alinement with that of the adjacent depression 14. In the socket thus formed by the portions 14 and 15, balls 18 are swiveled and which are carried by studs 19 rising loosely through openings 20 in plates 15.

One of the studs 19 is bolted as at 21, since it is screw threaded, by means of one or more nuts 22 to an attaching bracket 23 which may be bolted or otherwise secured as at 24 to the beam or side bar A. Another of said studs 19 may be fastened by nuts or the like as at 25 to a U-shaped bracket 26 adapted to be bolted or otherwise attached as at 27 to said side beam A. The shapes of the brackets 23 and 26 will depend upon conditions, particularly the shape and point of attachment of the adjacent side beam A. In the instances mentioned the shapes differ as one of the brackets is attached to the end of such beam and another is attached intermediate its ends.

Endless open frames or shackles 28, preferably made in a single piece are provided for the ends of said springs B opposite to the brackets 23 and 26. The upper cross bars 29 of said shackles has the remaining studs 19 pass therethrough and secured in place by means of nuts or the like at 30.

The lower cross bars of the shackles 29 which are designated 31 are depressed as at 32 in order to provide substantially semi-spherical sockets and disposed on said cross bars 31 are plates 33 similar to the plates 15, thereby having substantially semi-spherical sockets or portions 34. Cross bar 31 and plates 33 have outwardly extending ears 35 and 36 through which removable bolts 37 pass in order to detachably secure plates 36 in place. Balls 38 are swiveled in the sockets provided by portions 31 and 34 and have screw threaded stems 39 rising therefrom and passing through enlarged openings 40 in the plate 36.

Brackets 41 and 42 have the screw threaded shanks 39 passing therethrough and secured thereto as by nuts 43 or other suitable means. These brackets 41 and 42 are attached as by means of bolts 44 and 45 to the side beam A. Brackets 41 and 42 differ in shape and size according to conditions, similar to the brackets 23 and 26, that is in the matter of the location of their attachment in the side beam and the size thereof.

As a result of the improvement described, ball and socket connections are provided between the springs B and frame A and at one end of each spring such connection is doubled. As a result of this construction there will be less likelihood of the springs breaking and the car will have easier riding qualities causing less wear on the tires and prolonging the life of the car or automobiles generally.

A particular and very important feature of the present invention is the matter of lubricating the balls and sockets. In this connection washers or rings 47 of felt or other material permeable by oil or lubricant are used. The studs 19 and 39 extend snugly through the washers or rings 47. Such washers 47 tend to exclude dust and foreign matter from the socket and they are adapted exteriorly of the socket to have the oil or lubricant applied to them. The oil or lubricant will permeate the washers and enter the sockets so as to efficiently lubricate them and the balls therein. Such washers are merely held in place by the flanges 46 and are readily removable and replaceable and they do not have to be opened or their normal condition disturbed in the application of lubricant to the parts.

As merely one operative embodiment has been illustrated and described, it is to be understood that changes in the details may be resorted to provided they fall within the spirit and scope of the invention.

I claim as my invention:—

1. A vehicle spring suspension including a shackle substantially of endless form having its lower wall provided with a socket, a ball in said socket, a stud extending from the ball, means to connect the ball to a vehicle engaging the stud, a securing plate for the ball through which said stud extends and fastens to said bottom wall, a plate above said stud attachable to a spring, said plate forming a socket, a ball in the latter socket, a stud extending from the latter ball and depending from the top wall of the shackle, and means to secure the latter ball in a socket.

2. A vehicle spring suspension including a shackle, a stud carried thereby having a ball, socket means for said ball extending from the spring, a second stud, a ball and socket joint between the second stud and shackle, and an attaching bracket from which the second stud extends.

3. A vehicle spring suspension including a shackle having an upper and a lower cross bar, a ball suspended from the upper cross bar, means providing a socket receiving said ball and carried by the spring, the lower cross bar having a socket, means attachable to a vehicle having a ball disposed in the latter socket, and a plate securing the latter ball in the socket and disposed over the lower cross bar.

4. A vehicle spring suspension including a shackle having an upper cross bar and a lower cross bar, a stud extending through the upper cross bar, a nut securing said stud in place, a ball carried by said stud, an arm, a plate secured to said arm, said plate and arm having a socket in which said ball is disposed, ears rising from said arm, bolts passing through said ears and connecting the arm to a spring, the lower cross bar having a depression, a plate over said lower cross bar attachably secured thereto, a ball in said depression and latter plate, a stud extending from the latter ball and through the latter plate, an attaching bracket into which the latter stud extends and a nut securing the latter stud to said attaching bracket.

In testimony whereof I affix my signature in presence of two witnesses.

ROBERT E. SCRIVNER.

Witnesses:
W. B. SCRIVNER,
F. M. VAN HORN.